United States Patent
Russinovich (10) Patent No.: US 9,875,115 B2
(45) Date of Patent: Jan. 23, 2018

(54) MEMORY-PRESERVING REBOOT

(71) Applicant: Microsoft Corporation, Redmond, WA (US)

(72) Inventor: Mark E. Russinovich, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 179 days.

(21) Appl. No.: 14/136,890

(22) Filed: Dec. 20, 2013

(65) Prior Publication Data

US 2015/0178097 A1   Jun. 25, 2015

(51) Int. Cl.
G06F 9/44       (2006.01)
G06F 9/445      (2006.01)
G06F 9/455      (2006.01)

(52) U.S. Cl.
CPC .............. *G06F 9/4418* (2013.01); *G06F 8/67* (2013.01); *G06F 9/4401* (2013.01); *G06F 9/442* (2013.01); *G06F 9/45558* (2013.01); G06F 2009/45575 (2013.01)

(58) Field of Classification Search
None
See application file for complete search history.

(56) References Cited

U.S. PATENT DOCUMENTS

| | | | | |
|---|---|---|---|---|
| 4,731,740 A | * | 3/1988 | Eguchi ................ | G06F 12/1036 711/207 |
| 5,778,411 A | * | 7/1998 | DeMoss ................ | G06F 3/0607 710/68 |
| 6,854,054 B1 | | 2/2005 | Kavanagh | |
| 6,901,298 B1 | * | 5/2005 | Govindaraj .......... | G05B 19/058 700/21 |
| 7,130,997 B2 | | 10/2006 | Hsu et al. | |
| 7,533,254 B2 | | 5/2009 | Dybsetter et al. | |

(Continued)

OTHER PUBLICATIONS

Volos, et al., "Mnemosyne: Lightweight Persistent Memory", In Proceedings of the Sixteenth International Conference on Architectural Support for Programming Languages and Operating Systems, Mar. 5, 2011, 13 pages.

(Continued)

*Primary Examiner* — Paul J Yen
(74) *Attorney, Agent, or Firm* — Fogarty LLP (57) ABSTRACT

Techniques are described for preserving application state in virtual memory during operating system reboot. A preserved virtual memory allocation that has been populated with state by an application is identified. The application is shutdown during the OS reboot. The operating system is rebooted without modifying the preserved virtual memory allocation. For example, physical memory and paging file pages associated with the preserved virtual memory allocation on the computer system are unmodified when the operating system is rebooted. The application is restarted after the operating system has been rebooted. The preserved virtual memory allocations are identified after the application is restarted, such as by checking contents of a memory region or by an API return value. The application is then reconnected to the preserved virtual memory allocation, which allows the application to immediately access the preserved state without having to rebuild new state.

18 Claims, 5 Drawing Sheets

(56) References Cited

U.S. PATENT DOCUMENTS

| | | |
|---|---|---|
| 7,594,139 B2 | 9/2009 | Nellitheertha |
| 7,900,090 B2 | 3/2011 | Agrawal et al. |
| 2008/0005529 A1* | 1/2008 | Morris ................ G06F 12/1036 |
| | | 711/207 |
| 2008/0120480 A1* | 5/2008 | Dryfoos .............. G06F 11/1441 |
| | | 711/161 |
| 2009/0282396 A1 | 11/2009 | Boyer et al. |
| 2011/0125991 A1* | 5/2011 | Annan .................... G06F 9/445 |
| 2012/0023319 A1 | 1/2012 | Chin et al. |
| 2012/0096252 A1 | 4/2012 | Arditti et al. |
| 2013/0160012 A1* | 6/2013 | Ganguly ............. G06F 9/45558 |
| | | 718/1 |
| 2014/0157264 A1* | 6/2014 | Russinovich ............. G06F 8/67 |
| | | 718/1 |

OTHER PUBLICATIONS

U.S. Appl. No. 13/693,532, Russinovich, et al., "Virtual Machine-Preserving Host Updates", filed Dec. 4, 2012.

"International Search Report & Written Opinion Issued in PCT Application No. PCT/US2014/071002", dated Feb. 19, 2015, 12 Pages.

European Patent Office, "International Preliminary Report on Patentability," Issued in PCT Application No. PCT/US2014/071002, dated Jan. 22, 2016, 9 Pages.

European Patent Office, "Written Opinion of the International Preliminary Examining Authority," issued in PCT Patent Application No. PCT/US2014/071002, dated Oct. 16, 2015, 5 Pages.

\* cited by examiner

MEMORY-PRESERVING REBOOT

BACKGROUND

Operating system reboots disrupt applications by causing them downtime and by destroying derived and cached states they maintain in virtual memory thereby degrading their performance. Rebooting an operating system involves shutting down the running operating system and immediately starting it. There are several reasons for rebooting an operating system. For example, hardware maintenance and upgrades typically require the operating system to be offline before the hardware can be modified. More frequently, a reboot is required to apply code and configuration updates, and the operating system cannot adopt these updates without restarting.

Rebooting the operating system disrupts the applications running on the system, which must close client connections, commit their state to storage, and shut down. During the restart, those applications must then restore their state, rebuild memory caches, and resume accepting client connections. These disruptions are magnified in a virtualized environment because the reboot affects not only the applications operating on a host partition, but also the applications running on the hosted virtual machines.

During a reboot, applications running on a virtual machine will be offline during the time required to: shut down the virtual machine, shut down the host, run firmware Power-on Self-Test (POST), startup the host, startup the virtual machine, and startup the application. In some cases, the duration of this outage may be on the order of thirty minutes or more. If a Service Level Agreement (SLA) requires a specific availability for the application, the downtime caused by host operating system reboots will consume at least a portion of the SLA's downtime budget. This will leave less time in the SLA downtime budget for unplanned outages, which are unpredictable in terms of frequency and duration.

To mitigate the impact of host-caused reboots on virtual machines, most small-scale virtualization platforms have implemented live migration, which enables virtual machines to seamlessly move from one server to another in order to avoid a host's planned reboot. The downsides of live migration are that it adds significant complexity to overall system management, places a burden on networking resources, and extends the time required to apply updates. Rebooting a group of servers requires migrating every virtual machine at least once. And unless an empty server is paired with every one hosting virtual machines that will be migrated, the migration of virtual machines becomes a tile shuffle game and server updating can become a serial operation.

Virtual machine suspend-update-resume (VM-SUR) is an alternative to shutting down virtual machines based on existing virtual machine technology. With this approach, the host OS suspends virtual machines, saves their state (including RAM and virtual CPU) to disk, restarts the server into the updated host OS, and then resumes the virtual machines. This allows virtual machines to retain their in-memory caches and avoids virtual machine shutdown and restart. The drawback of VM-SUR is that the RAM of all virtual machines hosted on a server must be read and written to local storage as part of the host OS update, during which time the virtual machines are suspended. Using approximate numbers that reflect contemporary cloud hardware, the save and restore of 100 GB of RAM to local storage that has throughput of 100 MB/s would take about thirty minutes. That disruption is no better than that caused by a typical shutdown/restart and while virtual machines retain their caches, the downtime would be long enough to cause a visible outage for single-instance virtual machines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention use operating system support for reboot-persistent memory. The support consists of two mechanisms that both contribute to reducing the impact of reboots. The first mechanism is skipping firmware POST, which can be a significant contributor to reboot time and in physical environments can trigger hardware failures. The second mechanism is enabling applications to preserve specified states in memory across a reboot. Together, these enhancements are referred to herein as Memory-Preserving Reboot (MPR). These mechanisms can dramatically reduce application downtime and performance degradation that is caused by reboots, particularly for database, scientific and other memory-intensive applications. MPR also improves system resource utilization and reduces cost of operations.

In an example embodiment, systems and methods for preserving virtual memory in a computer system identify a preserved virtual memory allocation wherein preserved virtual memory allocation has been populated with state by an application. The preserved virtual memory allocation may be identified by the application using an API to select reboot-persistent virtual memory. The application is shutdown as part of an OS reboot. The operating system is then rebooted without modifying the preserved virtual memory allocation. For example, physical memory and paging file pages associated with the preserved virtual memory allocation on the computer system are unmodified when the operating system is rebooted. The application is restarted after the operating system has been rebooted. The preserved virtual memory allocations are identified after the application is restarted, such as by checking contents of a memory region or by an API return value. The application is then reconnected to the preserved virtual memory allocation, which allows the application to immediately access the preserved state without having to rebuild new state.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

To minimize the impact of an operating system ("OS") reboot, two mechanisms are used together to enable applications to preserve state in virtual or physical memory during the reboot. The first mechanism is an operating system soft reboot. This mechanism is disclosed in pending U.S. patent application Ser. No. 14/379,972 for "Virtual Machine-Preserving Host Updates" filed Dec. 4, 2012, the disclosure of which is hereby incorporated herein in its entirety. The second mechanism includes OS services that enable applications to specify portions of memory that should be preserved intact across a reboot and that allow the application to use the preserved memory after a reboot.

Computers must reboot for a variety of reasons. Some hardware changes necessitate a reset of the physical hardware on which the OS is running More frequently, OS reboots occur because OS or application updates require restarting execution from an initial state to apply the updates. Typical examples of such updates include updates to core OS components, which may add new functionality or fix security bugs, and configuration changes. In many cases, the complexity required to maintain consistency of an updating component's state, especially while it continues to offer service to dependent components, outweighs the benefits of supporting online updates. Despite the fact that reboots are disruptive to applications and end users, they cannot be eliminated.

OS reboots disrupt applications in two key ways. First, reboots cause application downtime. The duration of a reboot outage for an application includes the time required for application shutdown, OS shutdown, firmware POST, OS reboot, and application restart. Even if this downtime can be minimized or even reduced to zero, the applications lose all of the generated, derived, and cached state that is stored only in virtual memory. This causes a second disruption after the application has restarted. It may be possible for an application to quickly regenerate its state after restarting, but many applications require an extended period and many transactions to rebuild the state. If the application state is small relative to the speed of persistent storage, an application can preserve its state by serializing the state to storage during the reboot shutdown and then deserialize the state after restart. When the application state is large relative to the speed of persistent storage, however, the time allowed by the OS for application shutdown may not permit serialization of the state to storage. Even if given enough time, the performance degradation incurred during serialization and subsequent deserialization can be significant and effectively cause an application and its clients to experience negative effects of a reboot for tens of minutes or even hours later.

Figure 1:
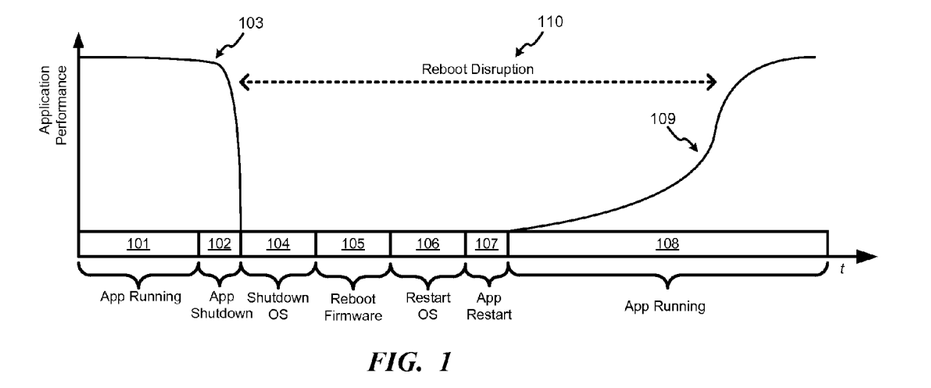
FIG. 1 illustrates. Reboot Impact on Application Performance the impact of an OS reboot on the performance of a database application.

FIG. 1 illustrates. Reboot Impact on Application Performance the impact of an OS reboot on the performance of a database application. In this example, a database application runs on a server with a large amount of RAM and relatively slow durable storage. After operating for some time (101), the application has fully populated RAM with its cached database state and achieved optimal performance. Then, an OS update is deployed that requires the server to reboot (or may just require the database application to shut down and restart). In this scenario, there is no point in the database application serializing the cached state because it can recreate the cache state from the source databases. Accordingly, the application commits outstanding transactions and quickly shuts down (102) and clears its cache (103). The OS then shuts down after all of the applications have closed (104). The server firmware reboots (105) before the OS restarts (106). Once the OS has restarted, the application may restart (107). The reboot takes some time, during which the clients cannot access the database, and the application starts with no cached data. When the application has restart and is running again (108), it does not know what client accesses will come in the future, and it must rebuild the database cache (109). During this rebuilding, most accesses will miss the cache and application response will be slow. Only after running again for hours after restart will the application build up the cache again to achieve its pre-reboot performance level In some scenarios, it may be possible for an application to quickly regenerate the state after restarting. As a result, the actual duration of the reboot disruption (110) is longer than the time that the application is was offline.

When they have to reboot, database and other caching applications lose state that is persisted elsewhere. Scientific and financial computation applications that perform long-running computations and generate large amounts of intermediate state are more impacted than other applications, because in addition to having to re-read potentially large amounts of data, these applications must also redo expensive computations either from the start or at least from a previous checkpoint.

Reducing the impact of a reboot on applications requires reducing the duration of the restart outage, but the impact can also be reduced be enabling applications to preserve derived and cached state across reboots. Memory-Preserving Reboot (MPR) may be used to reduce reboot outage and to prolong hardware health by avoiding POST. MPR uses proposed OS services to preserve application state stored in virtual memory across reboots.

Avoiding POST

OS developers will continue to improve the performance of the OS and applications during shutdown and restart; however, avoiding firmware POST will yield immediate and lasting improvements. Firmware reboot (105) can introduce significant delay into the reboot process, especially for slow bus enumerations. The accompanying hardware reset may push hardware over a failure threshold. VM-PHU introduces a new capability, called Kernel Soft Reboot (KSR), to shut down the OS to a loader stub and then restart updated OS code and configuration, thereby completely skipping firmware POST. VM-PHU is designed for image-based OS deployment, so the reboot is performed into a new OS virtual hard disk (VHD). KSR will work for component-based updates, where the loader boots back into the same, updated OS installation.

Preserving Memory Across Reboots

While KSR can reduce application downtime during reboot-requiring OS updates, it does not address the loss of application state. Omitting POST enables the preservation of RAM across reboots, which was what motivated the development of KSR in the context of VM-PHU. VM-PHU preserves the physical RAM assigned to virtual machines across host reboots, as illustrated in FIGS. 2A-C.

Figure 2A:
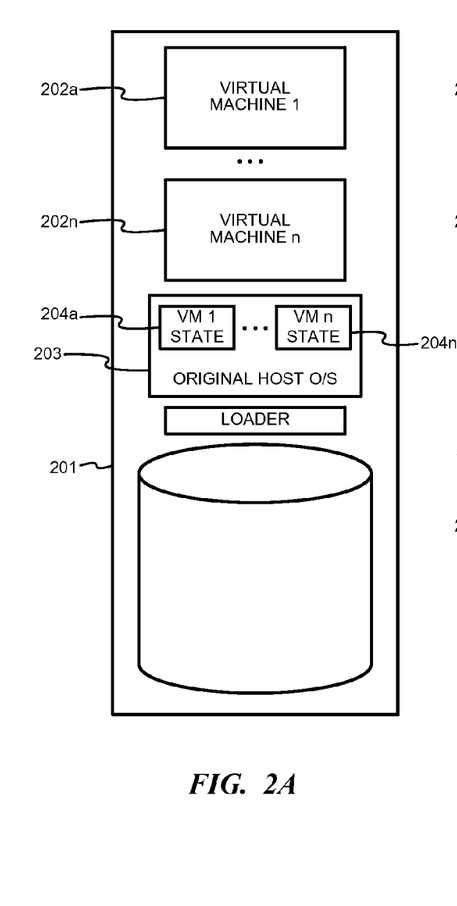
FIGS. 2A-C illustrate preservation of physical RAM assigned to virtual machines across host reboots.

FIG. 2A illustrates a server 201 hosting one or more virtual machines (VM) 202. Server 201 is running an active host OS 203, which supports virtual machines 202. Active host operating system 203 maintains a current state 204 for each virtual machine. VM-PHU minimizes virtual machine 202 downtime during active host operating system updates by leaving virtual machines 202 intact and suspending them only long enough to restart an updated host operating system.

Figure 2B:
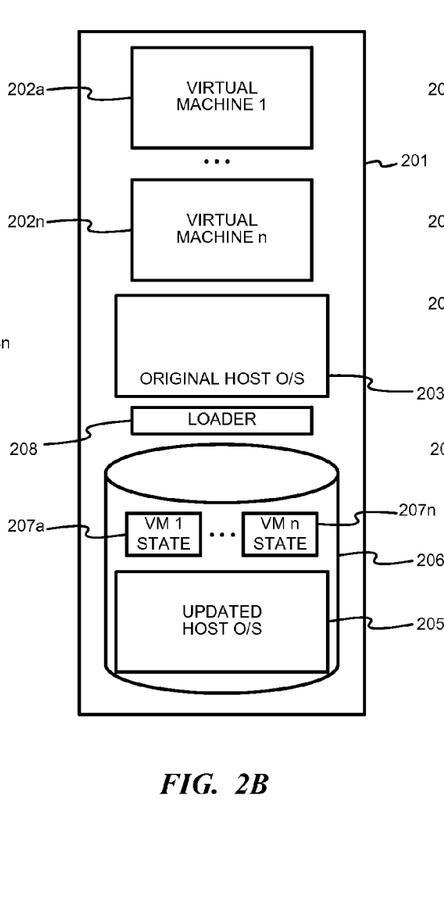

In FIG. 2B, an updated host operating system image (Updated Host OS) 205 has been stored to memory 206. The active host operating system 203 freezes the virtual machines 202 but leaves them resident in RAM on server 201. Active host operating system 203 records the allocations and VM states 204 for virtual machines 202 either to RAM and/or to local storage 206 as VM states 207. Active host operating system 203 shuts down as part of the operating system update and transfers execution to loader 208.

Figure 2C:
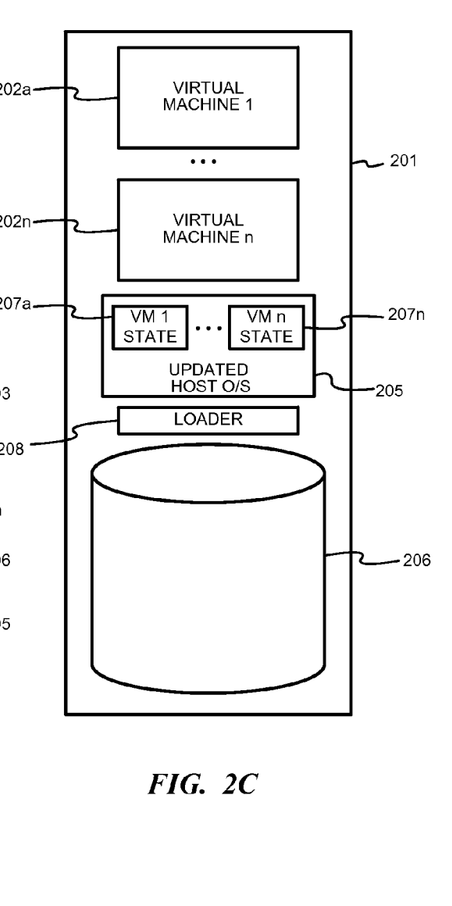

In FIG. 2C, loader 208 deletes active host operating system 203 that reads the kernel of updated host operating system 205 into RAM. Additionally, loader 208 passes an invocation from active host operating system 203 to updated host operating system 205 that includes an allocation map for the virtual machines 202 along with instructions to resume the virtual machines 202. Loader 208 transfers execution to the updated host operating system 205 entry point. After updated host operating system 205 initializes, it loads VM states 207 for virtual machines 202 and resumes them. The VM-PHU technique avoids the stress on server 201 caused by hardware resets and, therefore, prolongs the lifetime of server 201.

The duration of the outage experienced by hosted virtual machines 202 when the VM-PHU technique is employed is limited to the time taken to shut down the active host operating system 203 and then to load and start the updated host operating system 205. The VM-PHU technique skips firmware POST and avoids virtual machine 202 shut down and restart. Applications running in the virtual machines 202 do not lose their state or caches. If the updated host operating system 205 is loaded fast enough, then the disruption may be short enough that applications running on virtual machines 202 and their respective clients are not aware of the outage. Instead, clients of the virtual machine applications may perceive what appears to be a long network glitch, which all network clients are already designed to handle. If the virtual machine outage is short enough, such as less than thirty seconds, standard load balancer probe timeouts will not trigger thereby keeping the virtual machines 202 in rotation to pick up work as soon as they resume.

Using this same RAM preservation capability, an OS memory manager can expose an API that will allocate virtual memory that preserved through a reboot. The applications can then selectively manage their state by leveraging preservation support for state that is expensive to regenerate or to persist to storage. The combination of POST-skipping and memory preservation defines Memory-Preserving Reboot (MPR).

Figure 3:
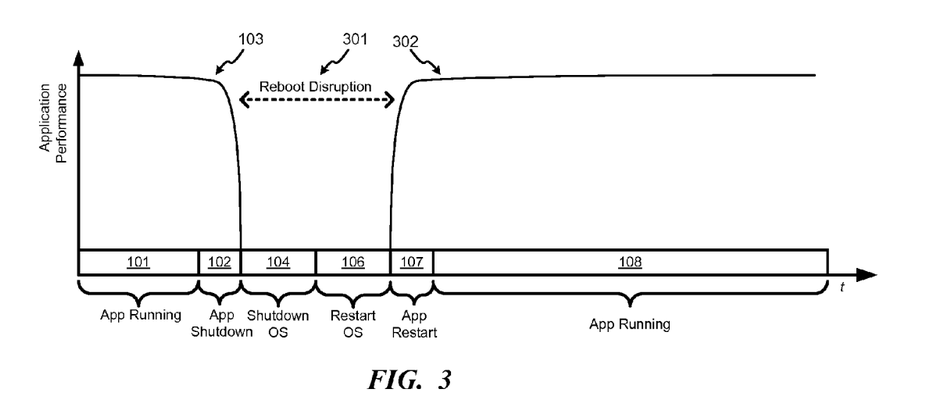
FIG. 3 illustrates the reduced impact of a reboot when an application takes advantage of Memory-Preserving Reboot.

FIG. 3 illustrates the reduced impact of a reboot on the same database application described in FIG. 1 when the application takes advantage of MPR. As illustrated in FIG. 3, the firmware reboot delay is eliminated using the VM-PHU technique, which allows the application to restart faster. Also, the reboot disruption (301) is minimized by preserving the cache memory, which allows the application performance (302) to rapidly return to pre-reboot levels (103).

It is noted that MPR introduces complexity for applications that use it. The applications must ensure that the state they preserve defines a closure. If the preserved state has any references to state that is not preserved (for example, by embedding pointers to data structures that were allocated in memory that was not preserved), then only part of the state will be preserved and the application will likely fail after reboot. Applications that opt-in to using MPR will carry the additional cost of maintaining and testing for the closure of their preserved data.

Physical and Virtual Memory Preservation

There are at least two ways to implement memory-preservation. In one approach using the Windows® OS from Microsoft Corporation, processes can use APIs, called Address Windowing Extensions (AWE), to allocate RAM. These APIs may be enhanced to offer a reboot-preservation mode. However, there are several drawbacks to relying on this API for reboot-preserving functionality. One consideration is that the AWE APIs remove the memory from the OS's management, thereby preventing the OS from using its global view to best decide what data should be stored in RAM versus be paged out to disk. Another consideration is that AWE APIs require an account privilege that is not granted to user accounts by default, thereby requiring a non-standard account configuration. The reason for this is that dedicating fixed physical resources to a specific application can degrade the performance of not only other applications, but the OS itself. Moreover, it is easier for applications to use the abstraction of virtual memory, not physical memory directly.

A second approach is more flexible, but more complex and involves offering applications an API for reboot-persistent virtual memory. A virtual memory-preserving API would take a unique application identifier, for example one assigned by the OS when a process registers with it, as well as an application-selected identifier for each virtual memory region the application wants to preserve. These allocation requests would return a virtual memory pointer just like standard allocation APIs. Applications would interact with the memory the same way and with the same APIs as they use for standard virtual memory.

An application would not need to implement special logic on reboot other than to detect, either by API return value or by checking the contents of the memory region that a region was preserved from the previous reboot. For example, initialized virtual memory is zero-filled so a one-byte value at the start of the region is a sufficient flag that a region was preserved. When a region contains preserved contents, an application can immediately access the state stored within it.

Figure 4A:
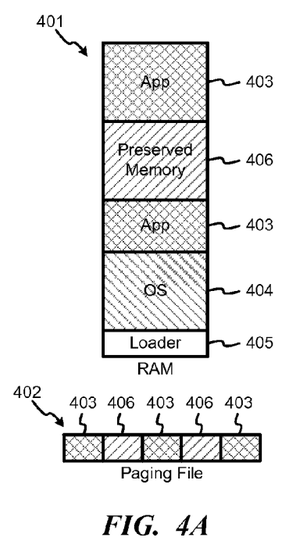
FIGS. 4A-C illustrate the basic behavior of preserved virtual memory.
Figure 4B:
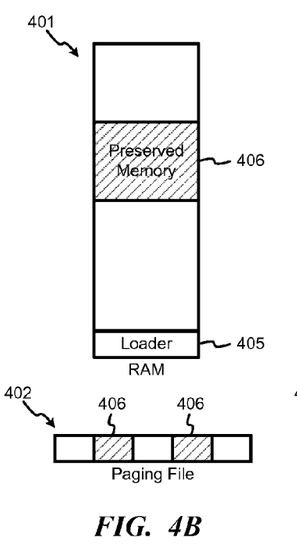
Figure 4C:
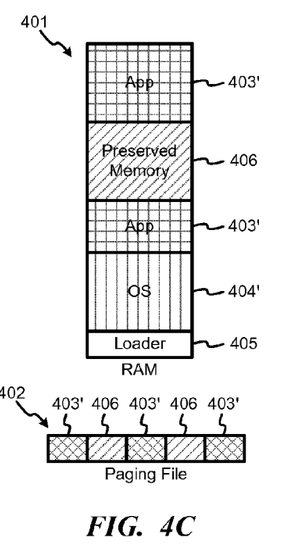

FIGS. 4A-C illustrate the basic behavior of preserved virtual memory. In FIG. 4A, RAM 401 and paging file 402 have been populated with application 403, OS 404, and Loader 405. Application 403 has made a preserved virtual memory allocation 406 and populated it with state. In FIG. 4B, the application (403) and operating system (404) have shut down to loader stub 405, leaving the physical memory 401 and paging file pages 402 associated with the virtual memory 406 undisturbed. In FIG. 4C, application 403' has restarted and been reconnected with preserved memory 406 and its contents by the updated operating system 404'.

Figure 5:
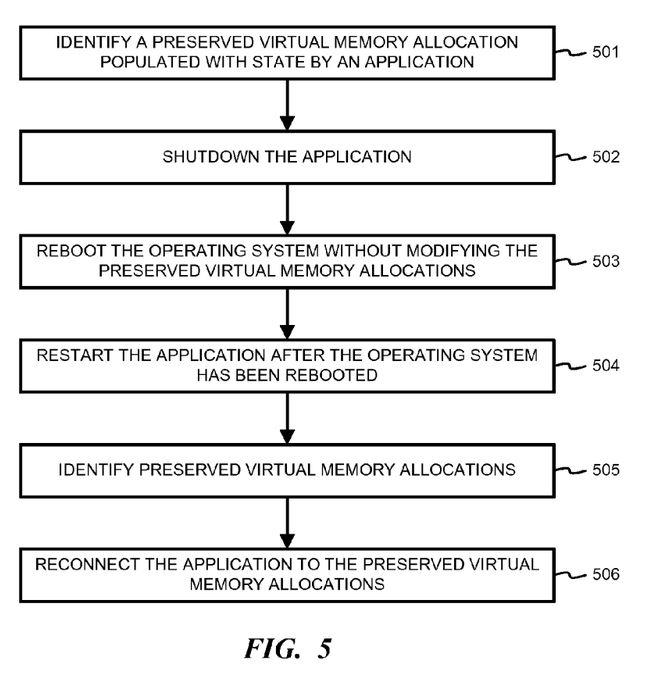
FIG. 5 is a flowchart illustrating a process or method for updating a host operating system while preserving the virtual machines running on a host server.

FIG. 5 is a flowchart illustrating a method for preserving virtual memory in a computer system according to one embodiment. In step 501, a preserved virtual memory allocation is identified. The preserved virtual memory allocation has been populated with state by an application. The preserved virtual memory allocation may be identified by the application using an API to select reboot-persistent virtual memory. In step 502, the application is shutdown.

In step 503, the operating system on the computer system is rebooted without modifying the preserved virtual memory allocation. For example, physical memory associated with the preserved virtual memory allocation on the computer system may be unmodified when the operating system is rebooted. Additionally, paging file pages associated with the preserved virtual memory allocation on the computer system may be unmodified when the operating system is rebooted.

In step 504, the application is then restarted after the operating system has been rebooted. In step 505, preserved virtual memory allocations are identified after the application is restarted. The preserved virtual memory allocations may be identified by checking contents of a memory region or by an API return value. In step 506, the application is reconnected to the preserved virtual memory allocation, which allows the application to immediately access the preserved state without having to rebuild new state.

Figure 6:
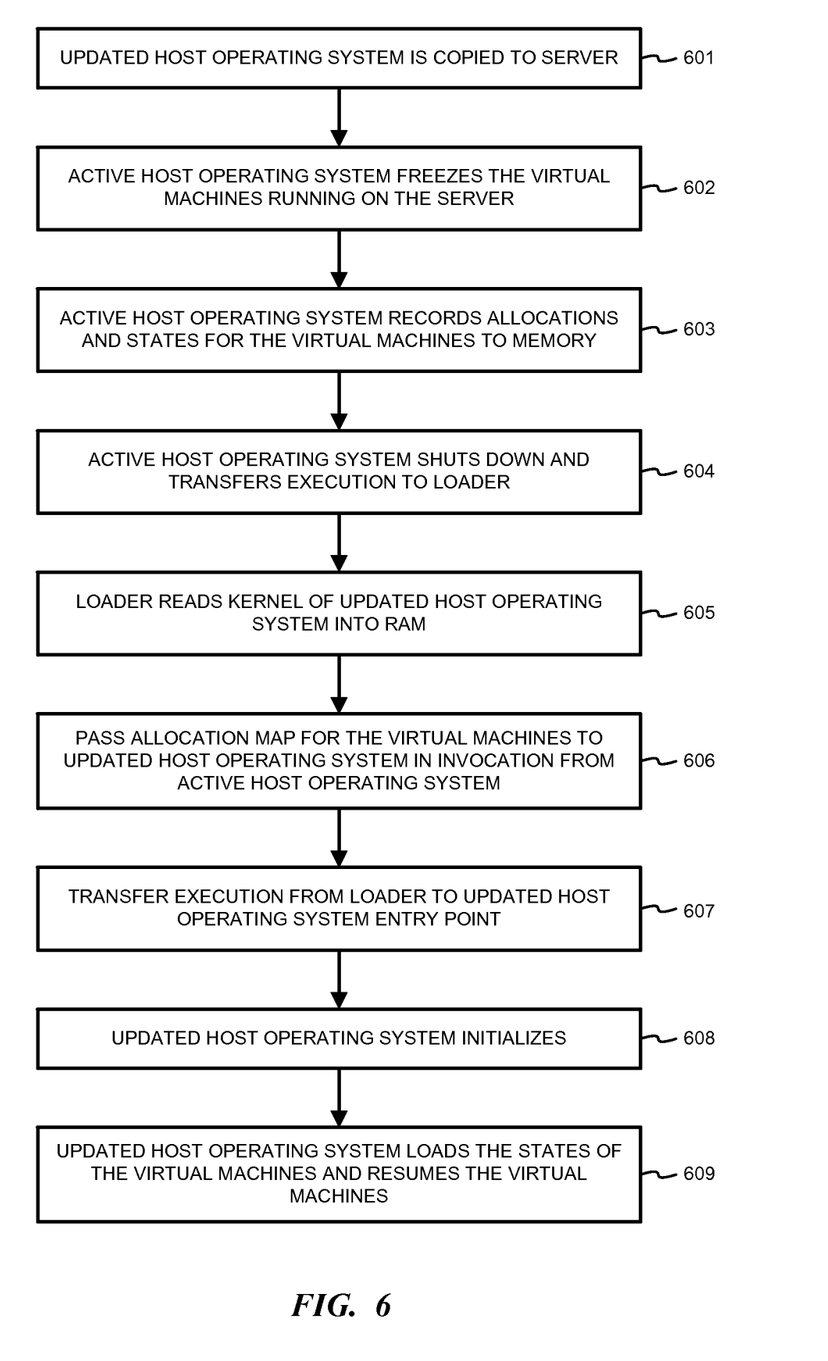
FIG. 6 is a flowchart illustrating a process or method for updating a host operating system while preserving the virtual machines running on a host server.

FIG. 6 is a flowchart illustrating a process or method for updating a host operating system while preserving the virtual machines running on a host server. In step 601, an updated host operating system is copied to RAM or local storage on the server. In step 602, the active host operating system freezes the virtual machines currently running on the server. In step 603, the active host operating system records allocations and states for the virtual machines to RAM or local storage. In step 604, the active host operating system then shuts itself down and transfers execution to a loader application.

In step 605, the loader reads the kernel of the updated host operating system into RAM. In step 606, the invocation from the active host operating system passes an allocation map for the virtual machines to the updated host operating system along with instructions to resume the virtual machines. In step 607, execution is transferred from the loader to updated host operating system entry point.

In step 608, the updated host operating system is initialized. Finally, in step 609, the updated host operating system loads the states of the virtual machines and resumes the virtual machines.

Figure 7:
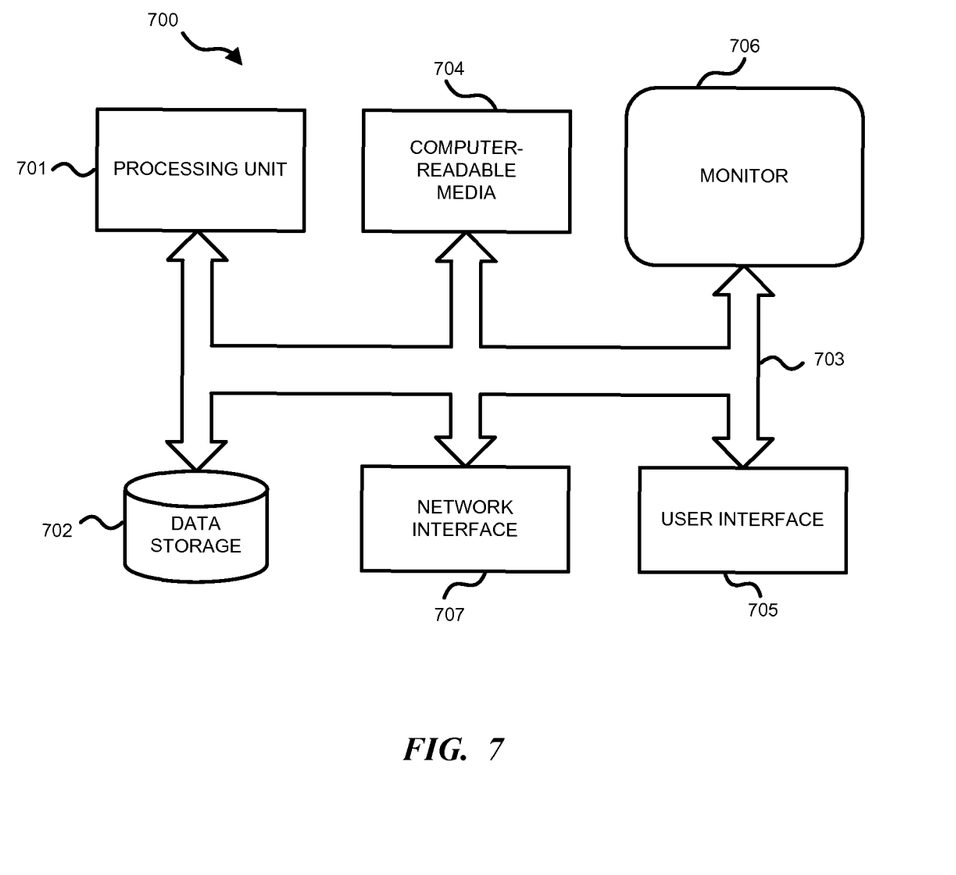
FIG. 7 illustrates an example of a computing and networking environment for updating a host operating system according to one embodiment.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 700.

A user may enter commands and information through a user interface 705 or input device. The user input interface 705 may be coupled to the system bus 703, but may be connected by other interface and bus structures. A monitor 706 or other type of display device may also be connected to the system bus 703 via an interface, such as a video interface.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of preserving virtual memory in a computer system, comprising:
   identifying a virtual memory allocation that is populated with state by an application;
   shutting down the application;
   rebooting an operating system in the computer system without modifying the virtual memory allocation, wherein rebooting the operating system comprises:
   receiving a copy of an updated operating system,
   transferring execution from the operating system to a loader,
   suspending one or more virtual machines running on the computer system,
   recording an allocation map and state for each of the one or more virtual machines,
   shutting down the operating system,
   reading a kernel of updated operating system into RAM via the loader,
   loading the allocation map and state for each of the one or more virtual machines, and
   resuming operation of the one or more virtual machines by the updated host operating system;
   restarting the application after the operating system has been rebooted; and
   reconnecting the application to the virtual memory allocation.

2. The method of claim 1, further comprising:
   leaving the virtual machines resident in RAM when the virtual machines are suspended.

3. The method of claim 1, wherein physical memory associated with the preserved virtual memory allocation on the computer system is unmodified when the operating system is rebooted.

4. The method of claim 1, wherein one or more paging file pages associated with the preserved virtual memory allocation on the computer system are unmodified when the operating system is rebooted.

5. The method of claim 1, wherein the preserved virtual memory allocation is identified by the application using an API to select reboot-persistent virtual memory.

6. The method of claim 1, further comprising:
   identifying preserved virtual memory allocation after the application is restarted.

7. The method of claim 5, wherein the preserved virtual memory allocation is identified by checking contents of a memory region.

8. The method of claim 5, wherein the preserved virtual memory allocation is identified by an API return value.

9. A computer system, comprising:
   a processor;
   system memory;
   one or more computer-readable storage media having stored thereon computer-executable instructions that, when executed by the processor, cause the processor to:
   identify a virtual memory allocation that is populated with state by an application;
   shut down the application;
   reboot an operating system in the computer system without modifying contents of the virtual memory allocation, wherein rebooting the operating system comprises: receiving a copy of an updated operating system, suspending one or more virtual machines running on the computer system, recording an allocation map and state for each of the one or more virtual machines, transferring execution from the operating system to a loader, shutting down the operating system, loading the allocation map and state for each of the one or more virtual machines, and resuming operation of the one or more virtual machines by the updated operating system;
   restart the application after the operating system has been rebooted; and reconnect the application to the virtual memory allocation.

10. The computer system of claim 9, wherein physical memory associated with the protected virtual memory allocation on the computer system is unmodified when the operating system is rebooted.

11. The computer system of claim 9, wherein one or more paging file pages associated with the protected virtual memory allocation on the computer system are unmodified when the operating system is rebooted.

12. The computer system of claim 9, wherein the protected virtual memory allocation is identified by the application using an API to select reboot-persistent virtual memory.

13. The computer system of claim 9, wherein the computer-executable instructions, upon execution by the processor, further cause the processor to:
   identify preserved virtual memory allocation after the application is restarted by checking contents of a memory region.

14. The computer system of claim 9, wherein the computer-executable instructions, upon execution by the processor, further cause the processor to:
   identify preserved virtual memory allocation after the application is restarted by an API return value.

15. A computer program product for implementing a method for preserving virtual memory allocations during updates to a host operating system, the computer program product comprising one or more computer-readable storage media having stored thereon computer-executable instructions that, when executed by one or more processors of a computer system, cause the computer system to:
   identify a virtual memory allocation that is populated with state by an application, wherein the virtual memory is allocated in a first set of memory locations, and wherein the virtual memory is allocated for preservation by the application;
   shut down the application;
   reboot an operating system in the computer system without modifying the virtual memory allocation preserved in the first set of memory locations, wherein rebooting the operating system comprises: receiving an updated operating system, suspending one or more virtual machines running on the computer system, recording an allocation map and state for each of the one or more virtual machines, transferring operation to a loader, shutting down the operating system, reading a kernel of the updated operating system into RAM via the loader, loading the allocation map and state for each of the one or more virtual machines, and resuming operation of the one or more virtual machines;
   restart the application after the operating system has been rebooted; and
   reconnect the application to the virtual memory allocation preserved in the first set of memory locations.

16. The computer program product of claim 15, wherein the computer-executable instructions, when executed by the one or more processors, further cause the computer system to:
   leave the virtual machines resident in RAM when the virtual machines are suspended.

17. The computer program product of claim 15, wherein physical memory associated with the preserved virtual memory allocation on the computer system is unmodified when the operating system is rebooted.

18. The computer program product of claim 15, wherein one or more paging file pages associated with the preserved virtual memory allocation on the computer system are unmodified when the operating system is rebooted.

* * * * *